(12) United States Patent
Greco

(10) Patent No.: US 8,535,051 B2
(45) Date of Patent: Sep. 17, 2013

(54) FOUR-WAY VALVE

(71) Applicant: Richard Greco, Palm City, FL (US)

(72) Inventor: Richard Greco, Palm City, FL (US)

(\*) Notice: Subject to any disclaimer, the term of this patent is extended or adjusted under 35 U.S.C. 154(b) by 0 days.

(21) Appl. No.: 13/707,161

(22) Filed: Dec. 6, 2012

(65) Prior Publication Data

US 2013/0092270 A1 Apr. 18, 2013

Related U.S. Application Data

(63) Continuation of application No. 12/881,444, filed on Sep. 14, 2010.

(60) Provisional application No. 61/242,086, filed on Sep. 14, 2009.

(51) Int. Cl.
*F23D 11/44* (2006.01)

(52) U.S. Cl.
USPC ..................... 431/215; 137/625.43

(58) Field of Classification Search
USPC ............... 431/215; 432/180, 181, 402, 183;
137/625, 625.2, 625.21, 43–45, 309, 625.43;
137/599.14, 599.11, 637.1, 637.05; 165/97,
165/7, 276, 100, 901; 110/210
See application file for complete search history.

(56) References Cited

U.S. PATENT DOCUMENTS

| | | | |
|---|---|---|---|
| 797,253 A | 8/1905 | Banister | |
| 2,595,012 A | 4/1952 | Smith | |
| 2,910,284 A | 10/1959 | Fritz | |
| 2,999,640 A | 9/1961 | Waterfill | |
| 3,170,678 A | 2/1965 | Keefer | |
| 3,306,676 A | 2/1967 | Gurney | |
| 3,334,947 A | 8/1967 | Franco | |
| 3,384,421 A | 5/1968 | Werner | |
| 3,495,614 A | 2/1970 | Guzman | |
| 3,516,440 A | 6/1970 | Bartley et al. | |
| 4,470,806 A | 9/1984 | Greco | |
| 4,497,361 A | 2/1985 | Hajicek | |
| 4,961,908 A | 10/1990 | Pennington et al. | |
| 5,129,332 A | 7/1992 | Greco | |
| 5,134,945 A | 8/1992 | Reimlinger et al. | |
| 5,149,259 A | 9/1992 | Greco | |
| 5,221,522 A | 6/1993 | Cash | |
| 5,279,235 A | 1/1994 | Greco | |
| 5,293,827 A | 3/1994 | Nester et al. | |
| 5,326,194 A | 7/1994 | Tanaka | |
| 5,352,115 A | 10/1994 | Klobucar | |
| 5,376,340 A | 12/1994 | Bayer et al. | |
| 5,427,521 A | 6/1995 | Greco | |
| 5,515,909 A | 5/1996 | Tanaka | |
| 5,540,584 A | 7/1996 | Greco | |
| 5,569,312 A | 10/1996 | Quirk et al. | |
| 5,578,276 A | 11/1996 | Klobucar | |

(Continued)

*Primary Examiner* — Kenneth Rinehart
*Assistant Examiner* — Jason Lau
(74) *Attorney, Agent, or Firm* — Dickinson Wright PLLC

(57) ABSTRACT

A four-way valve for use in a regenerative thermal oxidizer (RTO) assembly for alternating between a first cycle with a gas flowing in a first direction and a second cycle with a gas flowing in a second direction. A partition divides the interior of the housing of the valve into an input zone and an output zone. A pivot shaft rotatable about an axis is disposed in the interior of the housing, and a pair of opposing dampers extend radially outwardly on opposite sides of the pivot shaft. A plurality of ducts are disposed in the housing. Each duct engages one of the input and output apertures and extends into one of the input and output zones for engaging the dampers to restrict the flow of gas during the first and second cycles.

12 Claims, 12 Drawing Sheets

(56) References Cited

U.S. PATENT DOCUMENTS

| | | |
|---|---|---|
| 5,620,668 A | 4/1997 | Driscoll et al. |
| 5,700,433 A | 12/1997 | Somary |
| 5,871,349 A | 2/1999 | Johnson et al. |
| 5,931,663 A | 8/1999 | Lewandowski et al. |
| 5,997,292 A | 12/1999 | Tanaka et al. |
| 6,039,927 A | 3/2000 | Greco |
| 6,129,139 A | 10/2000 | De Clerc |
| 6,261,092 B1 | 7/2001 | Cash |
| 6,899,121 B2 | 5/2005 | Cash |
| 7,325,562 B2 | 2/2008 | Cash |
| 7,766,025 B2 | 8/2010 | Greco |
| 7,766,039 B2 | 8/2010 | Zuck |
| 2003/0035762 A1 | 2/2003 | Cash |
| 2003/0221725 A1 | 12/2003 | Greco |
| 2008/0136172 A1 | 6/2008 | Roe et al. |
| 2008/0314550 A1 | 12/2008 | Greco |
| 2011/0061576 A1 | 3/2011 | Greco et al. |

FOUR-WAY VALVE

CROSS-REFERENCE TO RELATED APPLICATIONS

The present application is a continuation-in-part of U.S. application Ser. No. 12/881,444 filed Sep. 14, 2010, which is a non-provisional of U.S. Application No. 61/242,086 filed Sep. 14, 2009.

BACKGROUND OF THE INVENTION

1. Field of the Invention

The present invention relates to a four-way valve for use in a regenerative thermal oxidizer (RTO) assembly and other regenerative heat exchange devices.

2. Description of the Prior Art

RTOs are used in a number of industries to reduce the quantity of contaminants in a contaminated gas. In an RTO, the contaminated gas is routed through a flow path, which includes a combustion chamber for oxidizing the contaminated gas to produce a clean gas. A first recovery chamber is disposed in the flow path on one side of the combustion chamber, and a second recovery chamber is disposed in the flow path on the other side of the combustion chamber. Each of the recovery chambers typically includes a ceramic media. The RTO alternates between a first cycle with the gas flowing in a first direction and a second cycle with the gas flowing in a second direction. While operating in the first cycle, as the high temperature clean gas leaves the combustion chamber, it is routed through the first recovery chamber. In the recovery chamber, heat is transferred from the clean gas to the ceramic media. The flow of the gas is reversed during the second cycle such that the contaminated gas flows through the heated first recovery chamber before entering the combustion chamber. Heat is transferred from the hot ceramic media to the contaminated gas, and consequently, less energy is required to oxidize the contaminated gas in the combustion chamber.

A valve assembly is required to direct the gas in the first direction through the flow path while operating in the first cycle and to direct the gas in a second direction through the flow path while operating in the second cycle. One such valve assembly is shown in FIG. 3 of U.S. Pat. No. 5,515,909, issued to Tanaka on May 14, 1996 (hereinafter referred to as Tanaka '909). Tanaka '909 shows a four-way valve assembly including a housing presenting an open interior and having a front, a back, an input side, and an output side. The input side of the housing defines an intake, and the output side of the housing defines an outlet. A partition is disposed in the open interior to divide the interior into an input zone and an output zone. The housing defines an input aperture and an output aperture. A pivot shaft rotatable about an axis is disposed in the interior of the housing, and a pair of opposing dampers engage the pivot shaft and extend radially outwardly therefrom for rotating with the pivot shaft to restrict the flow of gas through the apertures during the first and second cycles.

SUMMARY OF THE INVENTION AND ADVANTAGES

According to one aspect of the invention is for such a four-way valve assembly and including a plurality of ducts disposed in said housing with each duct in fluid communication with one of the input and output apertures and extending into the associated one of the input and output zones for engaging the dampers to restrict the flow of gas during said first and second cycles.

According to another aspect of the invention, each of the dampers is operably coupled to a driven arm for selectively opening and closing the input and output apertures and an undriven arm for maintaining the associated damper in a predetermine orientation throughout its range of motion.

ADVANTAGES OF THE INVENTION

The four-way valve of the subject invention can be assembled more quickly and less expensively than those of the prior art because the dampers directly engage the ducts disposed in the housing during the first and second cycles. In contradistinction, the Takana '909 valve relies on a pair of expensive and specially designed partitions to engage the dampers during the first and second cycles.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
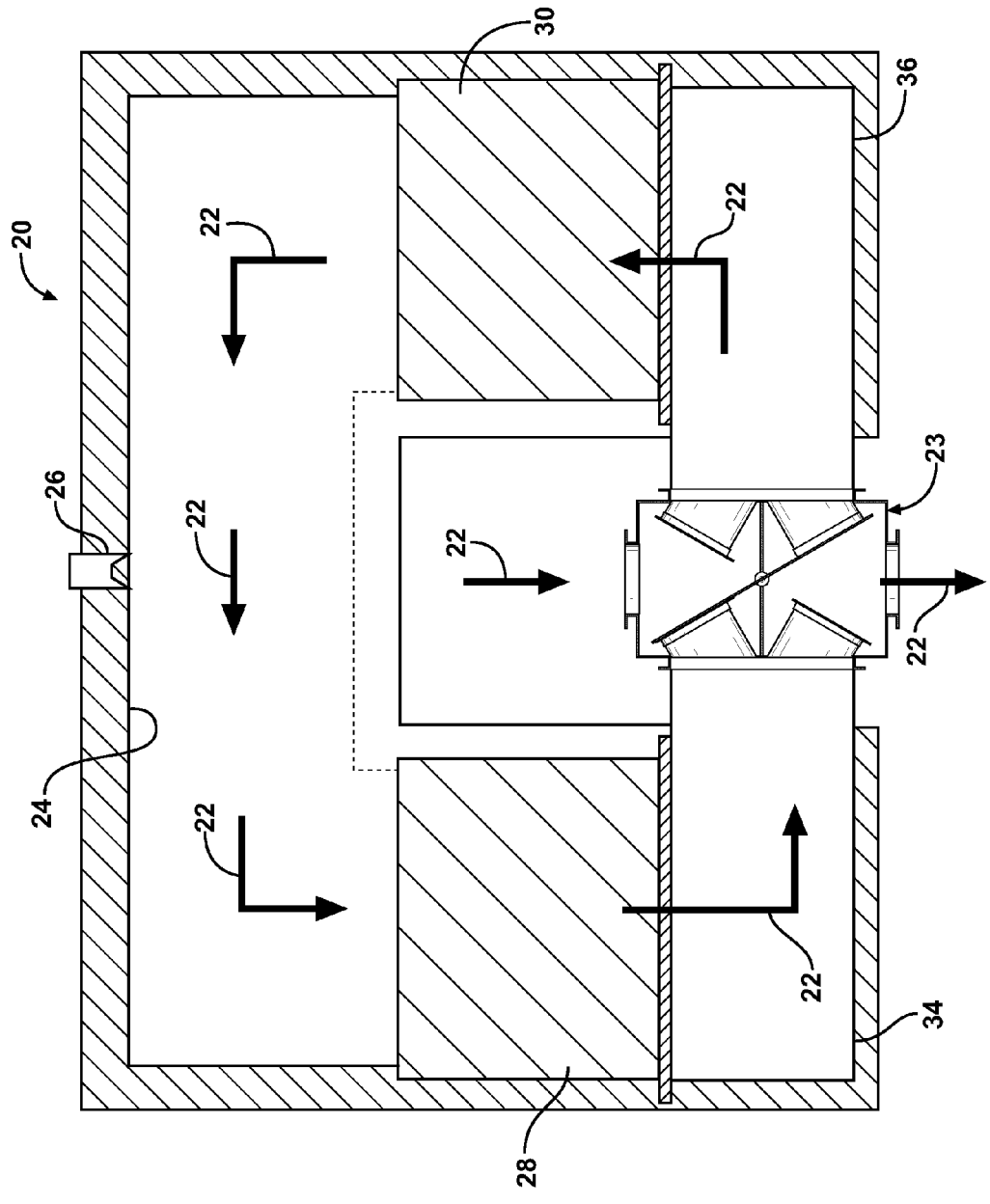
FIG. 1 is a diagram of one aspect of the subject invention showing the gas flowing through the RTO assembly in a first direction.
Figure 2:
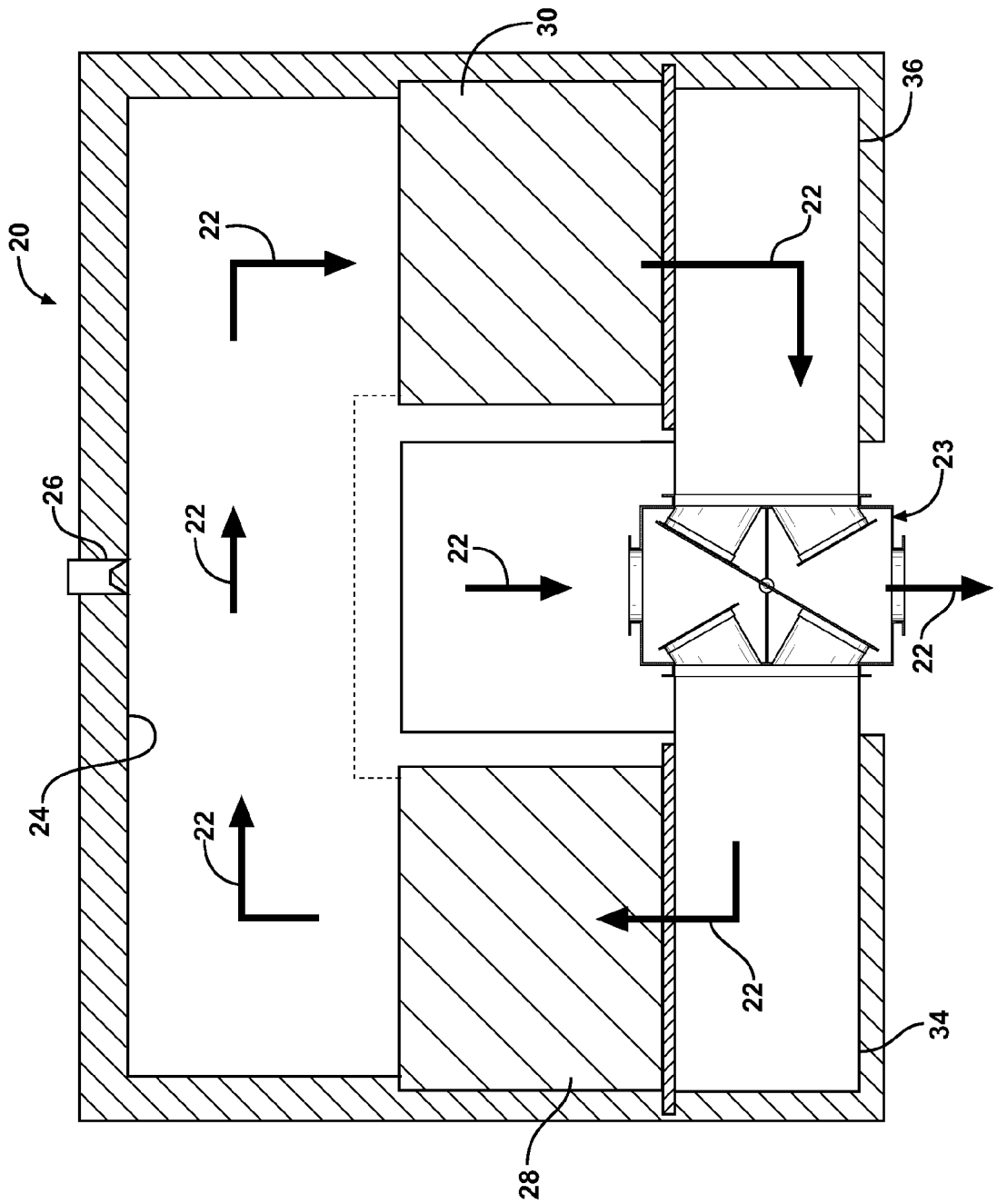
FIG. 2 is a diagram of one aspect of the subject invention showing the gas flowing through the RTO assembly in a second direction.

Referring to the Figures, wherein like numerals indicate corresponding parts throughout the several views, a regenerative thermal oxidizer (RTO) assembly 20 is generally shown in FIGS. 1 and 2. It is to be understood that the four-way valve 23 exemplary embodiment is shown for use with an RTO assembly 20, but could be used in any other application, for example with fluids other than gas. The RTO assembly 20 establishes a flow path 22, generally indicated, for cleaning a contaminated fluid (preferably a gas). The assembly 20 alternates between operating in a first cycle, shown in FIG. 1, with the gas flowing in a first direction and a second cycle, shown in FIG. 2, with the gas flowing in a second direction.

A combustion chamber 24 is disposed in the flow path 22 and includes a burner 26 for oxidizing the contaminated gas to produce a clean and heated gas. A first heat recovery chamber 28 and a second heat recovery chamber 30 are disposed in the flow path 22 on either side of the combustion chamber 24. A heat exchange media, typically of ceramic, is disposed in each of the heat recovery chambers 28, 30 for storing and dispensing heat.

The first recovery chamber 28 receives the clean gas from the combustion chamber 24 during the first cycle and dispenses the contaminated gas to the combustion chamber 24 during the second cycle. Heat is transferred from the clean gas to the first recovery chamber 28 during the first cycle, thereby cooling the clean gas and heating the first recovery chamber 28. During the second cycle, heat is transferred from the heated first recovery chamber 28 to the contaminated gas to preheat the contaminated gas, which cools the first recovery chamber 28.

The second recovery chamber 30 receives the clean gas from the combustion chamber 24 during the second cycle and dispenses the contaminated gas to the combustion chamber 24 during the first cycle. Similar to the first recovery chamber 28, heat is transferred from the clean gas to the second recovery chamber 30 during the second cycle, thereby cooling the clean gas and heating the second recovery chamber 30. During the first cycle, heat is transferred from the heated second recovery chamber 30 to the contaminated gas to preheat the contaminated gas and cool the second recovery chamber 30. Together, the first and second recovery chambers 28, 30 preheat all of the contaminated gas before dispensing it to the combustion chamber 24. Preheating the contaminated gas improves the efficiency of the combustion chamber 24 because less energy is required to oxidize the contaminated gas.

A four-way valve 23, 123 is disposed in the flow path 22 for receiving the contaminated gas during both cycles, for directing the contaminated gas to the second recovery chamber 30 during the first cycle, for directing the contaminated gas to the first recovery chamber 28 during the second cycle, for receiving the clean gas from the first recovery chamber 28 during the first cycle, for receiving the clean gas from the second recovery chamber 30 during the second cycle and for dispensing the clean gas out of the flow path 22 during both cycles. A first conduit 34 extends between the four-way valve 23 and the first recovery chamber 28 for conveying the gas therebetween, and a second conduit 36 extends between the four-way valve 23 and the second recovery chamber 30 for conveying the gas therebetween.

Figure 3:
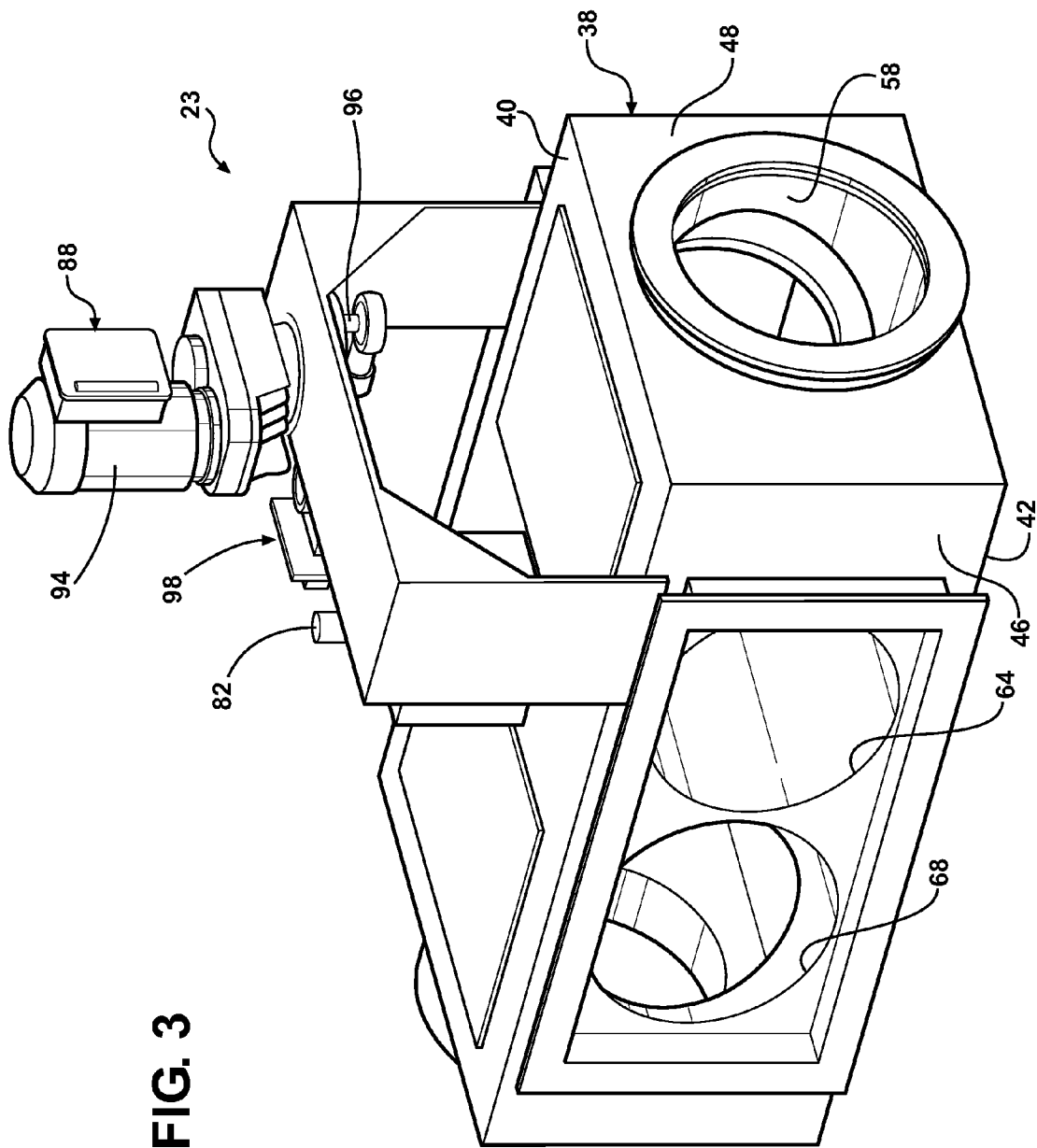
FIG. 3 is a perspective view of a first exemplary four-way valve.
Figure 4:
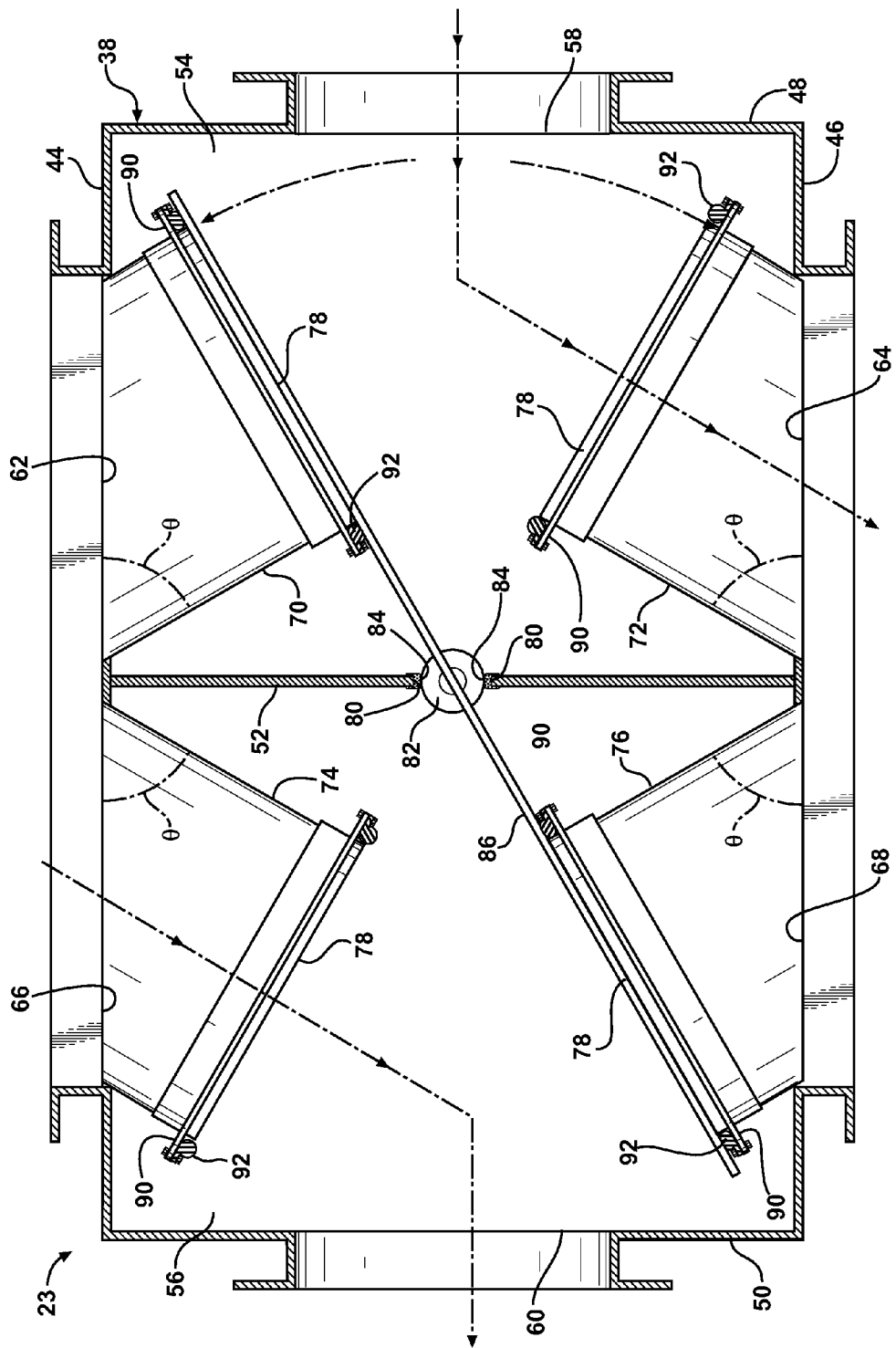
FIG. 4 is a cross-sectional view of the first exemplary four-way valve with the pivot shaft and dampers rotated to engage the first input duct and the second output duct during the first cycle.
Figure 5:
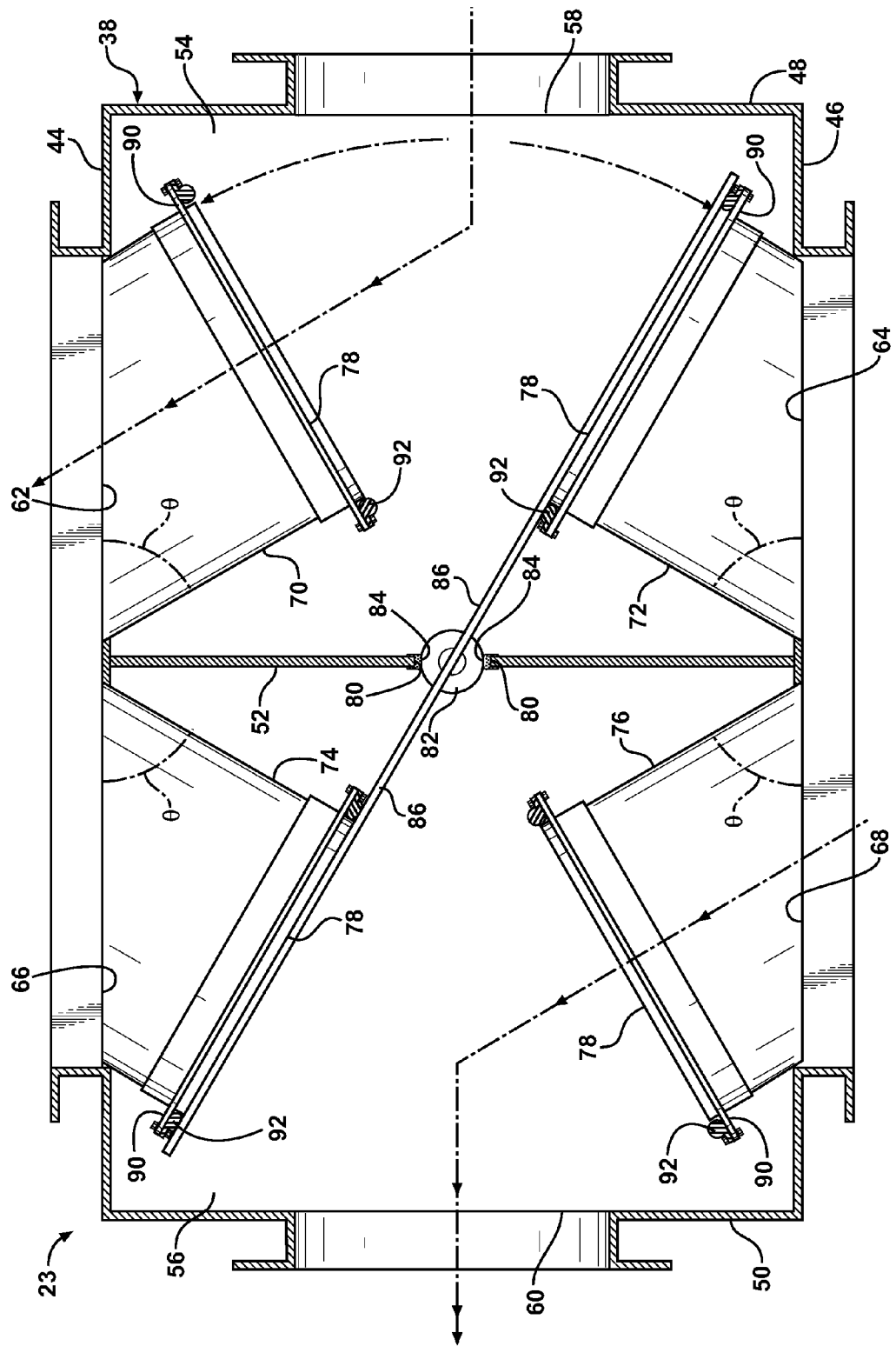
FIG. 5 is a cross-sectional view of the four-way valve with the pivot shaft and dampers rotated to engage the second input duct and the first output duct during the second cycle.

A first exemplary four-way valve 23 is generally shown in FIGS. 3-5 and includes a housing 38 having a top plate 40, a bottom plate 42, a front plate 44, a back plate 46, an input side plate 48, and an output side plate 50 to define a closed housing 38 having an open interior. The input and output side plates 48, 50 are in spaced and parallel relationship with one another and are disposed on opposite sides of the housing 38. The front and back plates 44, 46 are also in spaced and parallel relationship with one another on opposite sides of the housing 38. Other orientations of the top, bottom, front, back, input side 48, and output side plates 50 is contemplated.

Referring to FIG. 4, a partition 52 is disposed in the interior of the housing 38 and extends in spaced and parallel relationship with the input and output side plates 48, 50 between the front and back plates 44, 46. The partition 52 divides the open interior into an input zone 54 adjacent to the input side plate 48 and an output zone 56 adjacent to the output side plate 50. The input side plate 48 defines an intake 58 for receiving the contaminated gas and for delivering the contaminated gas into the input zone 54 of the housing 38. The output side plate 50 defines an outlet 60 for dispensing the clean gas out of the output zone 56 of the housing 38.

The front plate 44 of the housing 38 defines a first input aperture 62 establishing fluid communication between the first conduit 34 and the input zone 54 of the housing 38. The back plate 46 of the housing 38 defines a second input aperture 64 establishing fluid communication between the second conduit 36 and the input zone 54 of the housing 38 for conveying the contaminated gas from the input zone 54 of the housing 38 to the second recovery chamber 30. The front plate 44 of the housing 38 defines a first output aperture 66 establishing fluid communication between the first conduit 34 and the output zone 56 of the housing 38. The back plate 46 of the housing 38 defines a second output aperture 68 establishing fluid communication between the second conduit 36 and the output zone 56 of the housing 38.

The housing 38 further includes a first input duct 70 disposed in the input zone 54 of the housing 38 and extending inwardly from the first input aperture 62 for channeling the contaminated gas from the input zone 54 of the housing 38 to the first input aperture 62. A second input duct 72 is disposed in the input zone 54 of the housing 38 and extending inwardly from the second input aperture 64 for channeling the contaminated gas from the input zone 54 of the housing 38 to the second input aperture 64. A first output duct 74 is disposed in the output zone 56 of the housing 38 and extends inwardly from the first output aperture 66 for channeling the clean gas from the first output aperture 66 to the output zone 56 of the housing 38. A second output duct 76 is disposed in the output zone 56 of the housing 38 and extends inwardly from the second output aperture 68 for channeling the clean gas from the second output aperture 68 to the output zone 56 of the housing 38.

Each of the ducts 70, 72, 74, 76 is shown as being preferably cylindrically shaped and extending from the associated aperture to a duct end 78. In the exemplary embodiment, the duct end 78 of the first input duct 70 is preferably disposed in substantially the same plane as the duct end 78 of the second output duct 76, and the duct end 78 of the first output duct 74 is preferably disposed in substantially the same plane as the duct end 78 of the second input duct 72. Most preferably, each of the ducts 70, 72, 74, 76 is disposed at the same angle $\Theta$ of thirty degrees relative to the front and back plates 44, 46, and each of the ducts 70, 72, 74, 76 angles toward the associated one of the input and output side plates 48, 50. In other words, the first and second input ducts 70, 72 angle toward the input side plate 48, and the first and second output ducts 74, 76 angle toward the output side plate 50. It should be appreciated that the ducts 70, 72, 74, 76 do not have to extend at an angle $\Theta$ into the input and output zones 54, 56 of the housing 38, but could extend perpendicularly to the front and back side plates 48, 50. The duct ends 78 could alternately be cut at an angle $\Theta$ relative to the front and back side plates 48, 50. The angle $\Theta$ of the duct ends 78 improves the efficiency of the gas flowing between the ducts 70, 72, 74, 76 and either the intake 58 or the outlet 60 of the four-way valve 23.

Figure 6:
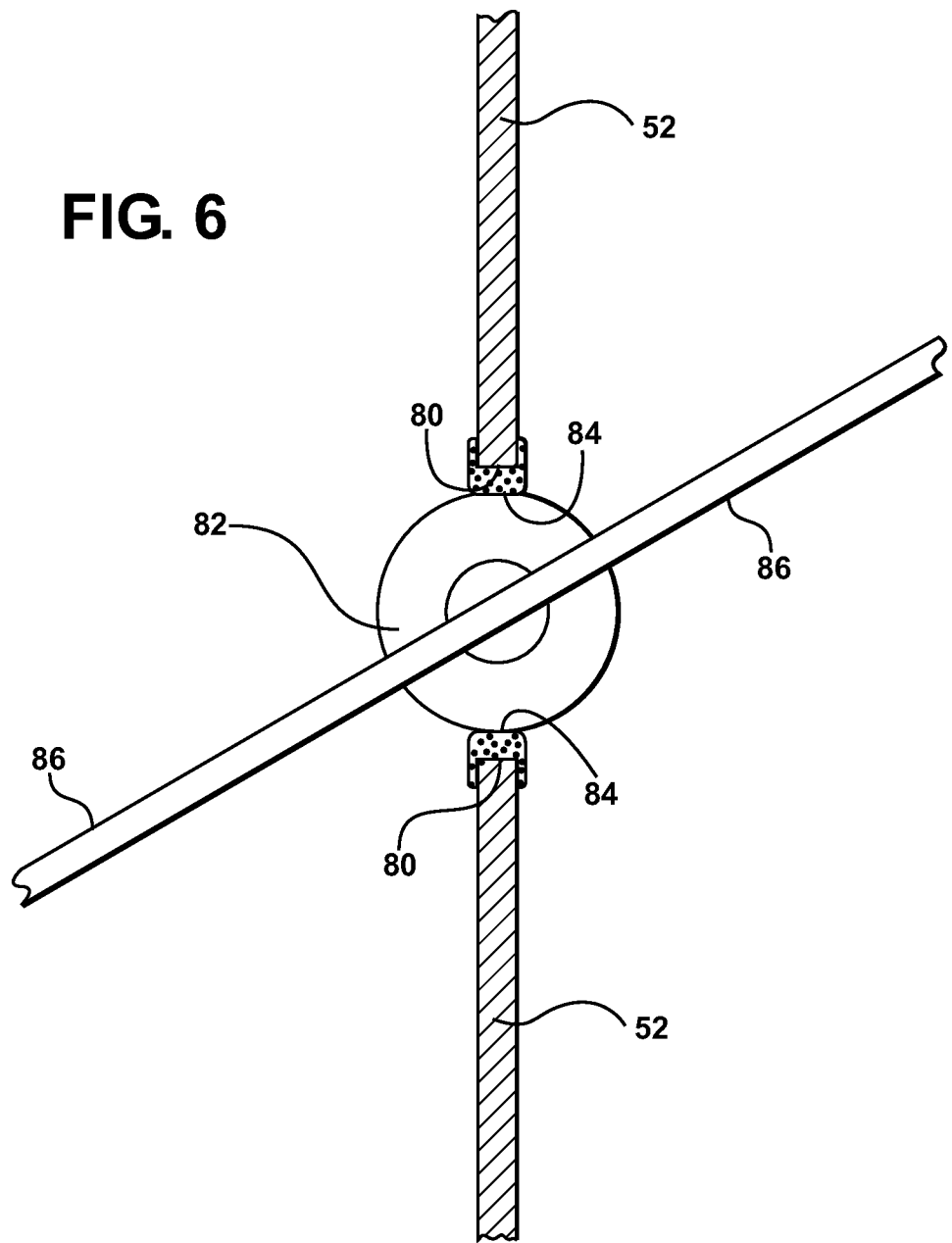
FIG. 6 is an exploded and cross-sectional view of the pivot shaft, the dampers, the partition, and the resilient seal.

Referring to FIG. 6, the partition 52 of the housing 38 presents a gap 80 approximately halfway between the front and back side plates 48, 50. A rotatable pivot shaft 82 is disposed in the gap 80, and the pivot shaft 82 extends along an axis A between the top and bottom plates 40, 42. A gasket 84 is disposed between the partition 52 and the pivot shaft 82. The gasket 84 makes friction contact with the pivot shaft 82 for sealing the partition 52 to the pivot shaft 82 to prevent gas from flowing directly between the input and output zones 54, 56 of the housing 38. The gasket 84 is preferably made of graphite, but any other material suitable for sealing the pivot shaft 82 to the partition 52 is acceptable.

The four-way valve 23 further includes a pair of opposing dampers 86 engaging the pivot shaft 82 and extending radially outwardly therefrom on opposite sides of the pivot shaft 82. The dampers 86 rotate with the pivot shaft 82 to engage the duct end 78 of one of the input ducts 70, 72 and the duct end 78 of one of the output ducts 74, 76 to restrict gas flow through the engaged ducts 70, 72, 74, 76. In other words, the dampers 86 rotate with the pivot shaft 82 to engage and seal the duct ends 78 of one of the input ducts 70, 72 and one of the output ducts 74, 76.

An actuator 88 is operably connected to the pivot shaft 82 and configured to rotate the pivot shaft 82 and the dampers 86 to a first position during the first cycle and a second position during the second cycle. As shown in FIG. 4, in the first position, one of the dampers 86 engages and seals the duct end 78 of the first input duct 70 and the other damper 86 engages and seals the duct end 78 of the second output duct 76. As shown in FIG. 5, in the second position, one of the dampers 86 engages and seals the duct end 78 of the second input duct 72 and the other damper 86 engages and seals the duct end 78 of the first output duct 74.

A seal retaining flange 90 is disposed about each of the ducts 70, 72, 74, 76 and spaced from the duct ends 78. A resilient seal 92 is disposed about each of the ducts 70, 72, 74, 76 and extending past the duct ends 78 for engaging the dampers 86. As shown in FIGS. 4 and 5, when engaging the dampers 86, the resilient seals 92 of the exemplary embodiment compress so that the dampers 86 directly engage the duct ends 78.

The four-way valve 23 functions to switch the assembly 20 between the first and second cycles. During the first cycle, the actuator 88 rotates the pivot shaft 82 and the dampers 86 to the first position shown in FIG. 4. The contaminated gas enters the four-way valve 23 at the intake 58 and is directed through the second input duct 72 to the second conduit 36. As shown in FIG. 1, the second conduit 36 conveys the contaminated gas to the second recovery chamber 30, where the contaminated gas is preheated before entering the combustion chamber 24. After being heated and cleaned in the combustion chamber 24, the heated and cleaned gas flows through the first recovery chamber 28, where it dispenses its heat into the first recovery chamber 28. The gas then flows through the first conduit 34 to the first output duct 74. As shown in FIG. 4, the first output duct 74 conveys the gas into the output zone 56 of the housing 38, where it is directed out of the flow path 22 through the outlet 60 of the four-way valve 23.

During the second cycle, the actuator 88 rotates the pivot shaft 82 and the dampers 86 to the second position shown in FIG. 5. The contaminated gas enters the four-way valve 23 at the intake 58 and is directed through the first input duct 70 to the first conduit 34. As shown in FIG. 2, the first conduit 34 conveys the contaminated gas to the first recovery chamber 28, where the contaminated gas is preheated before entering the combustion chamber 24. After being heated and cleaned in the combustion chamber 24, the heated and cleaned gas flows through the second recovery chamber 30, where it dispenses some of its heat into the second recovery chamber 30. The gas then flows through the second conduit 36 to the second output duct 76. As shown in FIG. 5, the second output duct 76 conveys the gas into the output zone 56 of the housing 38, where it is directed out of the flow path 22 through the outlet 60 of the four-way valve 23.

It is imperative that the actuator 88 rotates the pivot shaft 82 and the dampers 86 between the first and second positions quickly, as some contaminated fluid may escape through the outlet 60 of the housing 38 without being routed through the combustion chamber 24. In the exemplary embodiment, when rotating between the first and second positions, the actuator 88 accelerates the pivot shaft 82 for 0.2 seconds and decelerates the pivot shaft 82 for 0.2 seconds. A sensor (not shown) may be attached to the shaft to dictate when the actuator 88 should switch from accelerating to decelerating the shaft.

Figure 7:
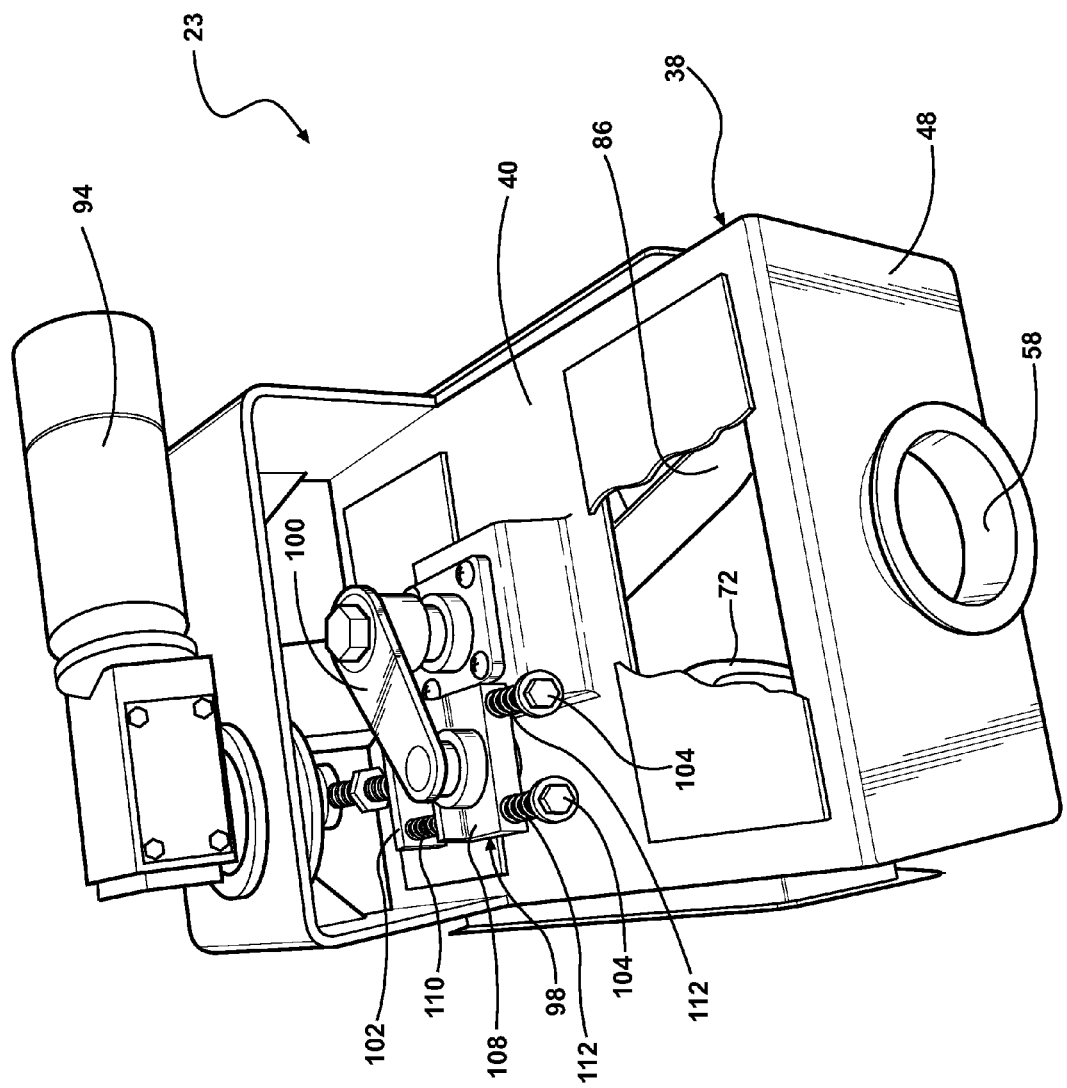
FIG. 7 is a perspective view of the first exemplary four-way valve during the first cycle.
Figure 8:
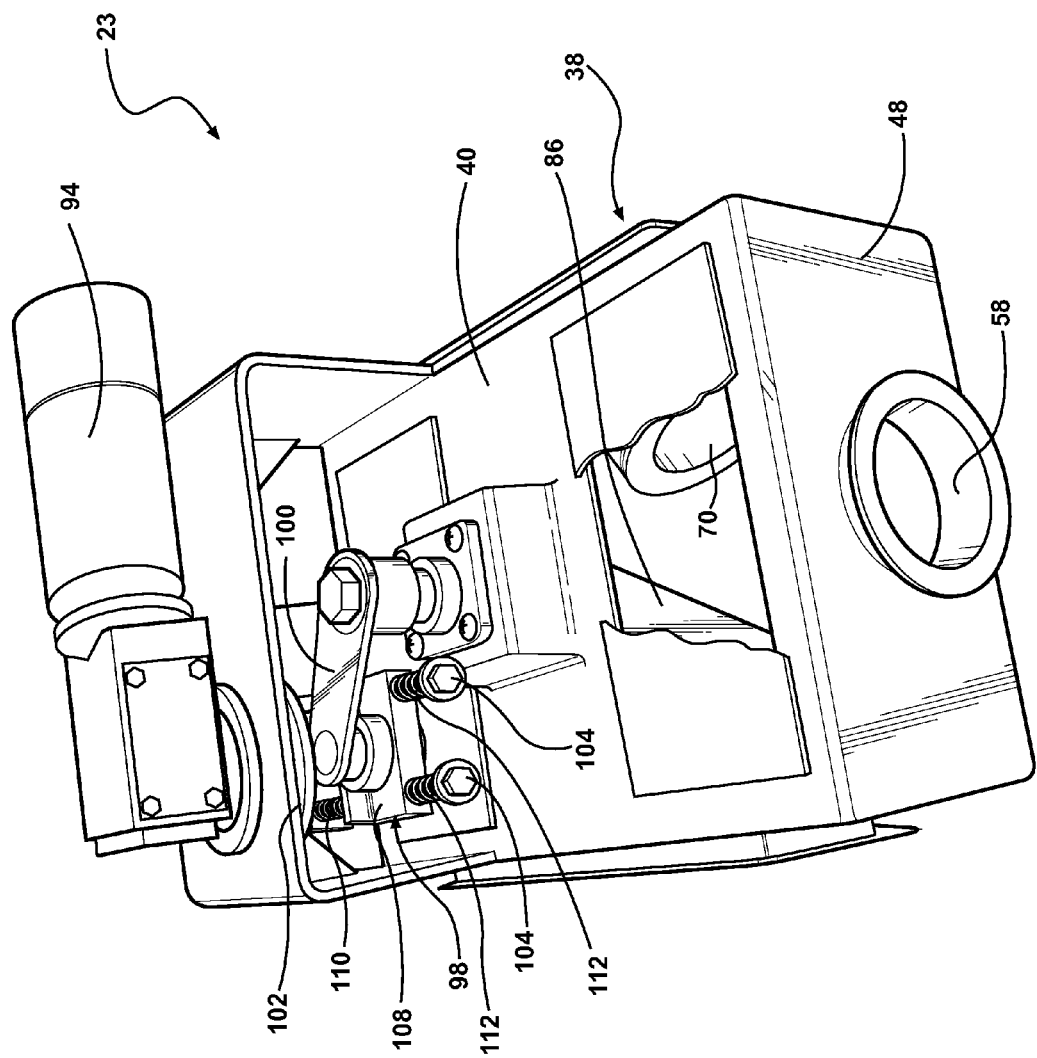
FIG. 8 is a perspective view of the first exemplary four-way valve during the second cycle.
Figure 9:
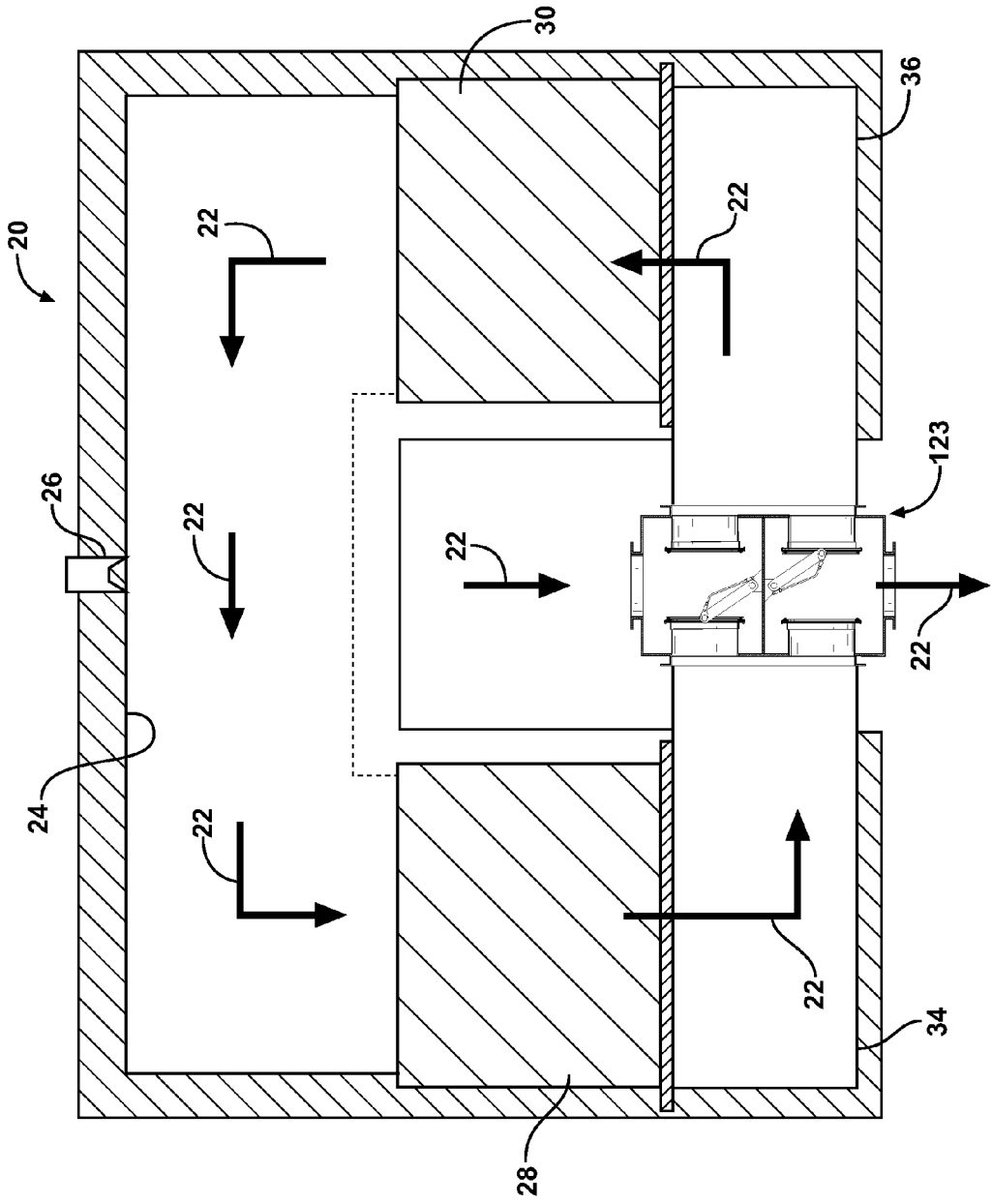
FIG. 9 is a diagram of another aspect of the subject invention including a second exemplary four-way valve with the gas flowing through the RTO assembly in a first direction.
Figure 10:
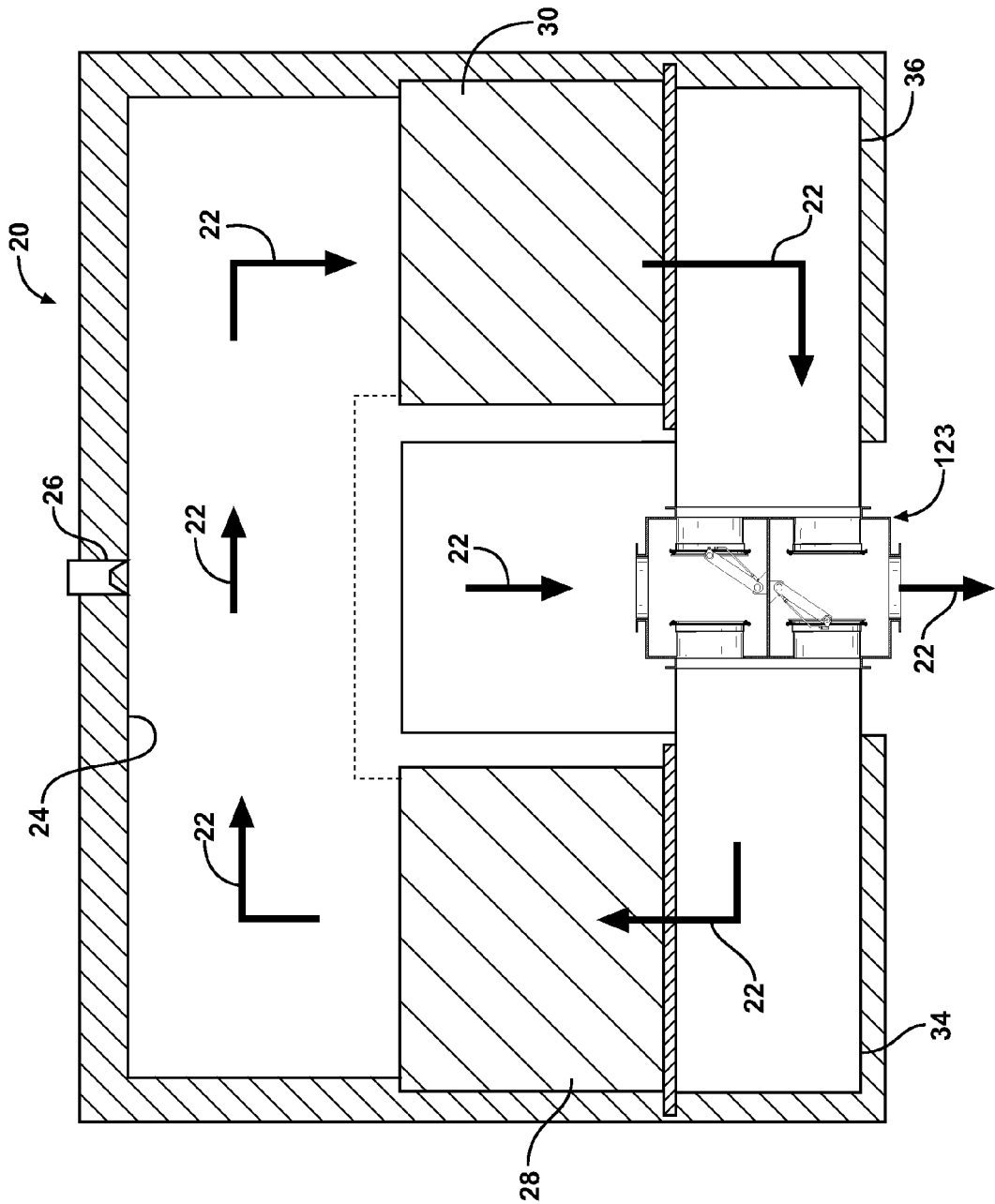
FIG. 10 is a diagram of the other aspect of the subject invention including the second exemplary four-way valve with the gas flowing through the RTO assembly in a second direction.
Figure 11:
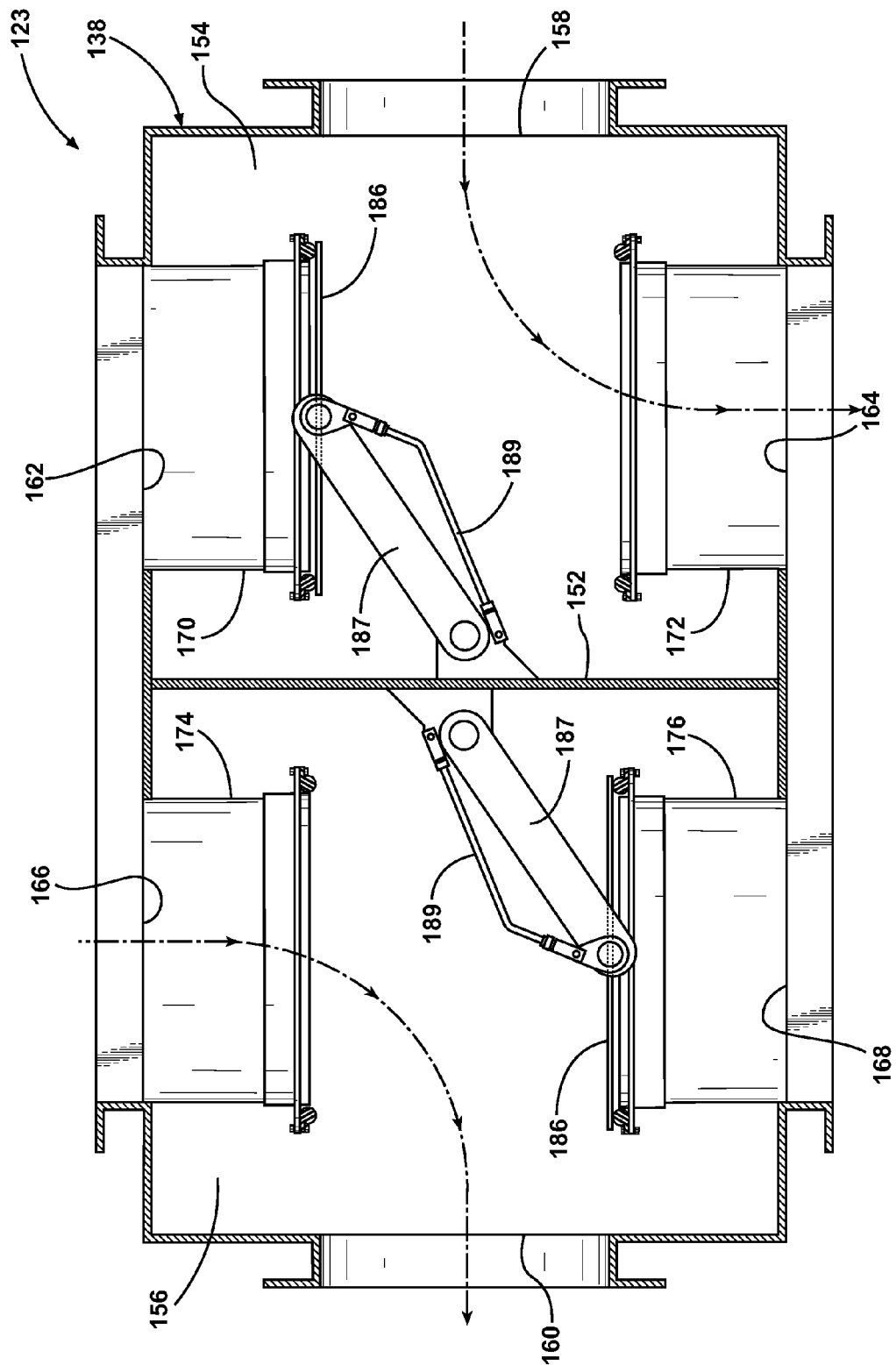
FIG. 11 is a cross-sectional view of the second exemplary four-way valve with the pivot shaft and dampers rotated to engage the first input duct and the second output duct during the first cycle.
Figure 12:
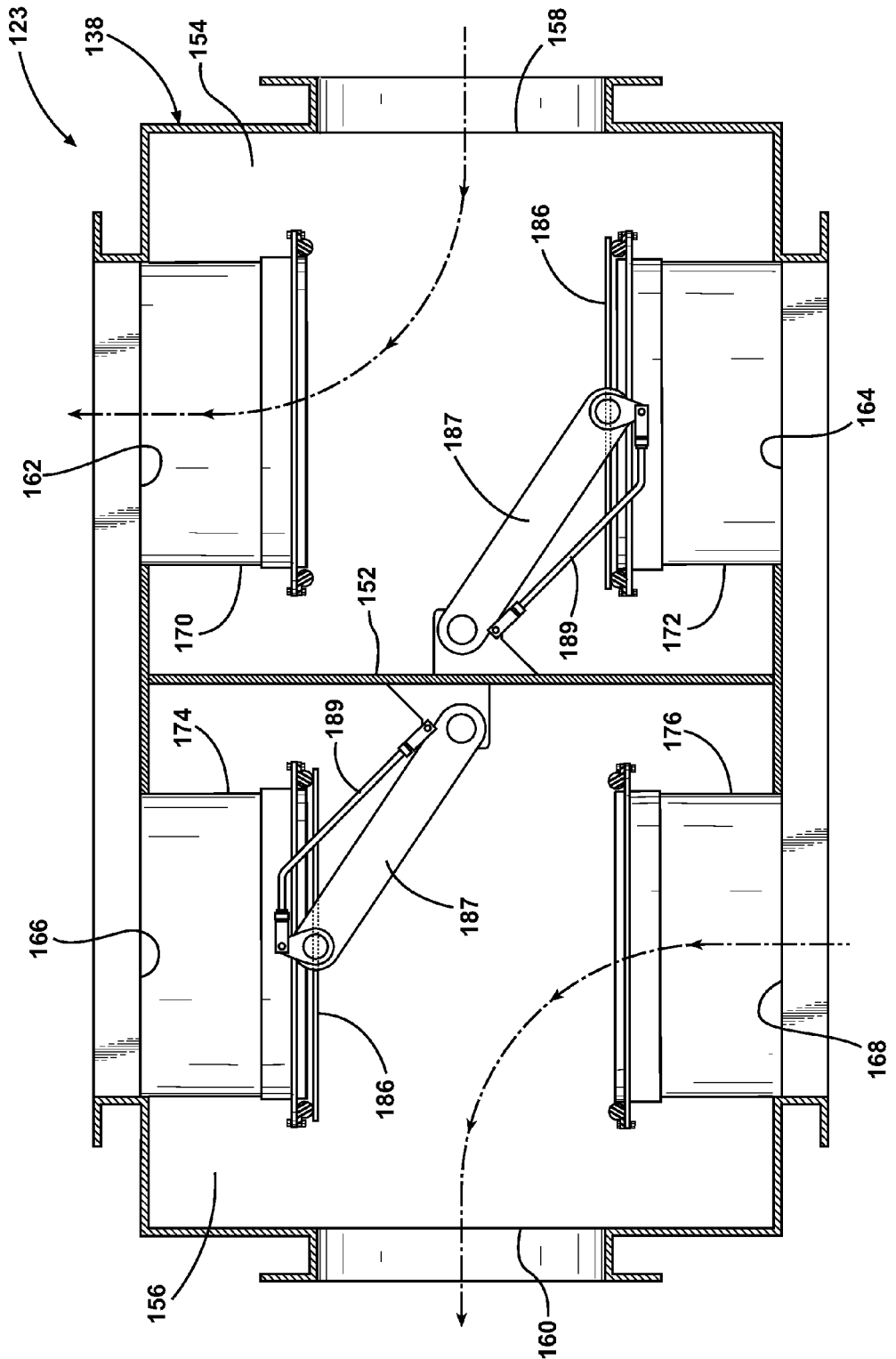
FIG. 12 is a cross-sectional view of the second exemplary four-way valve with the pivot shaft and dampers rotated to engage the second input duct and the first output duct during the second cycle.

It is also very important that the actuator 88 be precisely controlled to prevent the dampers 86 from slamming against the duct ends 78 when switching between the first and second positions. Referring to FIGS. 7 and 8, the actuator 88, generally shown, of the exemplary embodiment includes a motor 94, a rod 96, a loss motion connector 98, and a lever 100. The motor 94 could be an electric motor, a pneumatic actuator, or any other type of actuator capable of rotating the pivot shaft 82 and the dampers 86. The motor 94 is operably connected to the rod 96 for moving the rod 96 in a forward direction (FIG. 7) during the first cycle and for moving the rod 96 in a backward direction during the second cycle. The lever 100 engages the pivot shaft 82 for rotating with the pivot shaft 82. The loss motion connector 98 is operably connected between the rod 96 and the lever 100 for preventing the dampers 86 from slamming against the duct ends 78 and for maintaining a compression seal between the resilient seals 92 and the dampers 86 when the dampers 86 are in the first and second positions.

As shown in FIGS. 7 and 8, the loss motion connector 98, generally indicated, includes a connector plate 102 operably connected to the rod 96 for moving with the rod 96 in the forward direction during the first cycle and for moving with the rod 96 in the backward direction during the second cycle. A pair of spaced connector shafts 104 extend outwardly from the connector plate 102 to connector flanges 106 (shown as washers) at the end of the connector shafts 104. A slider 108 is slidably disposed along the connector shafts 104 between the connector plate 102 and the connector flanges 106. A plurality of front springs 110 are disposed about the shafts 104 and engaging the slider 108 and the connector plate 102, and a plurality of back springs 112 are disposed about the shafts 104 and engaging the slider 108 and the connector flanges 106. The front and back springs 110, 112 bias the slider 108 to a neutral position. The lever 100 attached to the pivot shaft 82 engages the slider 108 of the loss motion connector 98.

In operation, during the first cycle, the motor 94 moves the rod 96 and connector plate 102 forward to the position shown in FIG. 7. The lever 100 stops rotating and the slider 108 stops moving once the pivot shaft 82 and dampers 86 reach the first position. The rod 96 and connector plate 102 continue to move forward so that the back springs 112 maintain a biasing force on the slider 108 and lever 100 to form a compressive seal between the damper 86 and the resilient seal 92.

During the second cycle, the motor 94 moves the rod 96 and connector plate 102 backward to the position shown in FIG. 8. The lever 100 stops rotating once the pivot shaft 82 and dampers 86 reach the second position. The rod 96 and connector plate 102 continue to move backward so that the front springs 110 maintain a biasing force on the slider 108 and lever 100 to form a compressive seal between the dampers 86 and the resilient seals 92.

A second exemplary embodiment of the four-way valve 123 is generally shown in FIGS. 9-12. Similar to the first exemplary four-way valve 23 described above, the second exemplary four-way valve 123 includes a housing 138; a partition 152; an intake 158; an outlet 160; first and second input apertures 162, 164; first and second outlet apertures 166, 168; first and second input ducts 170, 172; and first and second output ducts 174, 176. In contrast to the first exemplary four way valve 23, the input and output ducts 170, 172, 174, 176 of the second exemplary four way valve 123 are not angled relative to one another and instead extend generally perpendicularly from their respective apertures 162, 164, 166, 168 such that the first and second input ducts 170, 172 are axially aligned with one another on opposite sides of the housing 138 and the first and second output ducts 174, 176 are axially aligned with one another on opposite sides of the housing 138. The partition 152, along with the remainder of the four-way valve 123, is preferably formed of steel but could alternately be formed of any desirable metallic or non-metallic material. The partition 152 completely eliminates any leakage from one side of the valve 123 to the other side of the valve 123.

The second exemplary valve 123 also includes a pair of dampers 186, one of which is disposed in the input zone 154 and the other of which is disposed in the output zone 156. The dampers are operably connected to one or more actuators, such as the actuator 88 of the first exemplary four way valve 123 described above. The dampers 186 are each attached to a driven arm 187 and an undriven (follower or tracking) arm 189. The driven arm 187 is operably connected to an actuator, and the undriven arm 189 is rotatably connected to a portion of the housing 138 for guiding the movement of the damper 186 such that the damper 186 remains in generally parallel relationship with both the first and second ducts 170, 172, 174, 176 of the associated zone 154, 156. In operation, the driven arm 187 rotates about a pivot point to move the associated damper 186 while the undriven arm 189, which is connected to a different portion of the damper 186 rotates about its own pivot point which is spaced from the pivot point of the driven arm 189. Together, the two arms 187, 189 cause the damper 186 to oscillate between a first position (shown in FIG. 9) in engagement with the duct end 178 of the first input duct 170 or a second output duct 176 and a second position (shown in FIG. 10) in engagement with the second input duct 172 or the first output duct 174. The arms 187, 189 are sized and positioned such that the damper 186 remains in generally parallel relationship with the duct ends 178 through the range of motion between the first and second positions.

In the second exemplary four-way valve 123, the ducts 170, 172, 174, 176 extend into the input and output zones 154, 156 such that the arms 187, 189 rotate by approximately 60 degrees when oscillating the dampers 186 between the first and second positions. This allows the movements of the dampers 186 between the first and second positions to be extremely quick. For example, the dampers 186 could move between the first and second positions in approximately 0.5 seconds. The driven arm 187 may be coupled to the actuator via a cam (not shown) which controls its movement. Both driven arms 187 could be coupled to the same cam or different cams, if desired.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims.

What is claimed is:

1. A four-way valve for alternating between a first cycle with a fluid flowing in a first direction and a second cycle with the fluid flowing in a second direction, comprising:

a housing having an open interior and a partition dividing said open interior into an input zone and an output zone, said housing including a first input aperture and a second input aperture spaced from and aligned with one another and in fluid communication with said input zone, said housing including a first output aperture and a second output aperture spaced from and aligned with one another and in fluid communication with said output zone of said housing, a first damper movably disposed in said input zone of said housing for selectively closing said first and second input apertures and a second damper movably disposed in said output zone for selectively closing said first and second output apertures, and each of said dampers being operably coupled to a driven arm for selectively opening and closing the associated input and output apertures and an undriven arm for maintaining the associated damper in a predetermined orientation throughout its range of motion.

2. The four-way valve as set forth in claim 1 further including a first input duct extending into said input zone from said first input aperture and a second input duct extending into said input zone from said second input aperture and a first output duct extending into said output zone from said first output aperture and a second output duct extending into said output zone from said second output aperture.

3. The four-way valve as set forth in claim 2 wherein each of said input and output ducts extends to a duct end.

4. The four-way valve as set forth in claim 3 wherein said first and second input ducts are axially aligned with one another and wherein said duct ends of said first and second input ducts are parallel to one another.

5. The four-way valve as set forth in claim 4 wherein said first and second output ducts are axially aligned with one another and wherein said duct ends of said first and second output ducts are parallel to one another.

6. The four-way valve as set forth in claim 5 wherein said driven arm and undriven arm coupled to said first damper maintain said first damper in generally parallel relationship with said duct ends of said first and second input ducts throughout its range of motion.

7. The four-way valve as set forth in claim 6 wherein said driven arm and undriven arm coupled to said second damper maintain said second damper in generally parallel relationship with said duct ends of said first and second output ducts throughout its range of motion.

8. The four-way valve as set forth in claim 7 wherein said driven and undriven arms oscillate the associated damper between a first position closing one of said ducts in the associated zone and a second position closing the other of said ducts in the associated zone.

9. The four-way valve as set forth in claim 8 wherein said oscillation of said driven and undriven arms between said first and second positions is approximately sixty degrees.

10. The four-way valve as set forth in claim 1 wherein said partition is formed of 2400F ceramic board.

11. The four-way valve as set forth in claim 1 further including a first driven arm operatively coupled to said first damper and a second driven arm operatively coupled to said second damper.

12. The four-way valve as set forth in claim 11 wherein said first and second driven arms are operably coupled to the same actuator.

\* \* \* \* \*